Figure 1:
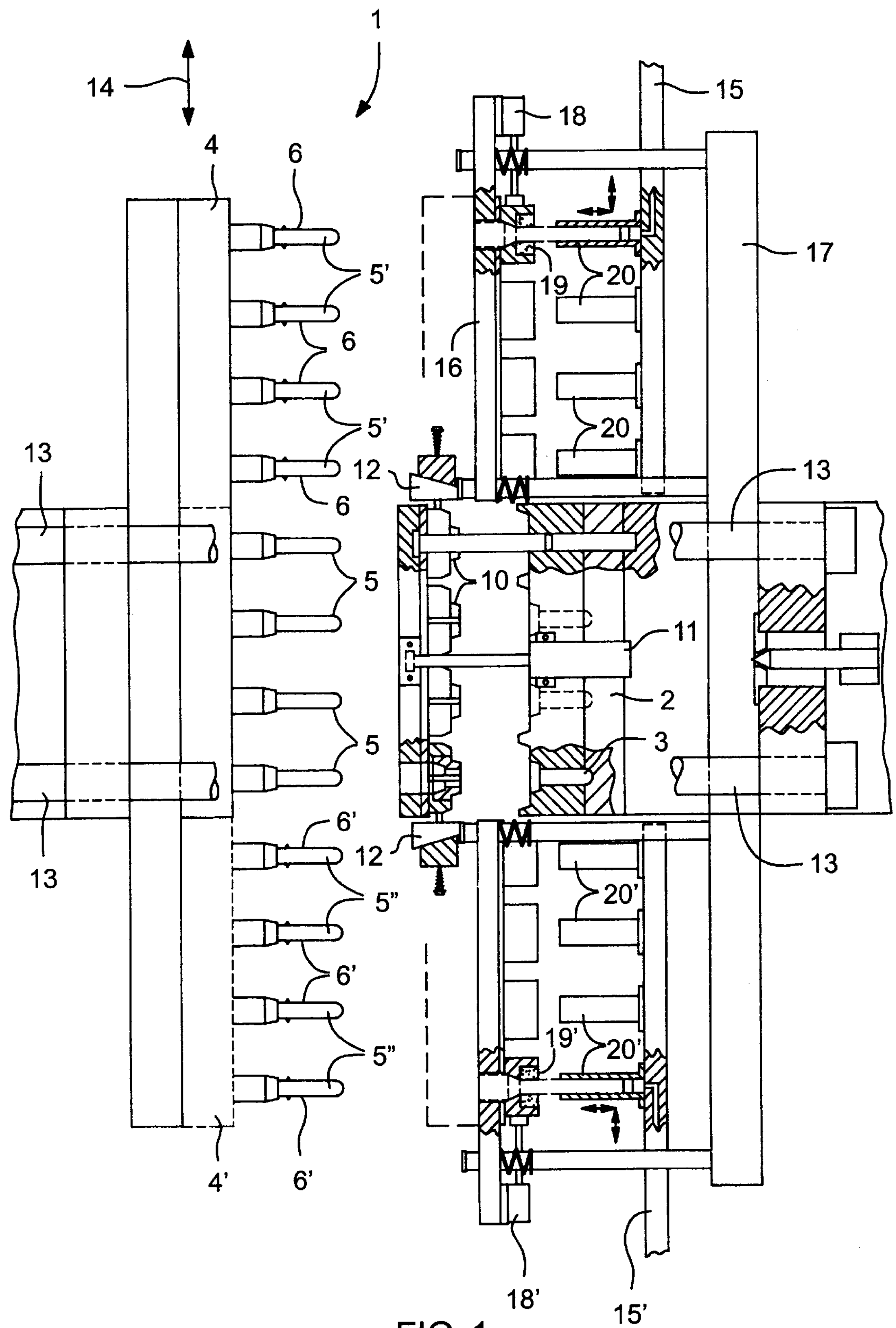

US006095788A

United States Patent [19]

van Manen et al.

[11] Patent Number: 6,095,788

[45] Date of Patent: Aug. 1, 2000

[54] INJECTION MOLDING MACHINE FOR MANUFACTURING HOLLOW PLASTIC ARTICLES

[75] Inventors: Dirk van Manen; Hendrikus Johannes Theodorus Albers, both of Dalen, Netherlands

[73] Assignee: Inter Tooling Services B.V., Emmen, Netherlands

[21] Appl. No.: 09/063,830

[22] Filed: Apr. 22, 1998

[30] Foreign Application Priority Data

Apr. 22, 1997 [NL] Netherlands ............................ 1005872

[51] Int. Cl.[7] ............................ B29C 45/44; B29C 49/64

[52] U.S. Cl. .......................... 425/526; 264/537; 425/534; 425/548; 425/556

[58] Field of Search .................................... 425/533, 526, 425/534, 541, 548, 556, 547; 264/537

[56] References Cited

U.S. PATENT DOCUMENTS

| | | | |
|---|---|---|---|
| 4,205,950 | 6/1980 | Suss et al. | 425/548 |
| 4,412,806 | 11/1983 | Gaiser et al. | 425/533 |
| 5,051,227 | 9/1991 | Brun, Jr. et al. | 425/533 |
| 5,501,593 | 3/1996 | Marcus | 425/526 |

FOREIGN PATENT DOCUMENTS

| | | |
|---|---|---|
| 0372671 | 6/1990 | European Pat. Off. . |
| 0688651 | 12/1995 | European Pat. Off. . |
| 7805477 | 11/1978 | Netherlands . |
| 2301308 | 12/1996 | United Kingdom . |

*Primary Examiner*—Robert Davis
*Attorney, Agent, or Firm*—Jacobson, Price, Holman & Stern, PLLC

[57] ABSTRACT

Apparatus for manufacturing hollow plastic articles, comprising a mold comprising a first part provided with at least one row of a number of cavities located next to each other and a second part provided with at least one row of a number of cores located next to each other, while the number of cores is twice the number of cavities, and the cores comprise two sets of cores, each set arranged in a manner corresponding to the position of the cavities, and means are provided for moving the second mold part back and forth in a direction transverse to the direction of opening and closing of the mold. A cooling device comprises a number of cooling cavities located between the cavities of a row and at both ends of the row of cavities. The cores of the two sets alternate with each other in a row of cores.

5 Claims, 5 Drawing Sheets

40 44 45 43a 42a 43b 42b 43c 44 45 49 46a 50 46b 46c 50 49 46d 48b 48d 47 48a 48c 51 41

INJECTION MOLDING MACHINE FOR MANUFACTURING HOLLOW PLASTIC ARTICLES

This invention relates to an apparatus for manufacturing hollow plastic articles, comprising a mold comprising a first part provided with a number of cavities located next to each other and a second part provided with a number of cores located next to each other, while in the closed position of the mold the cores reach into the cavities for forming a mold cavity and in an open position of the mold are entirely clear of the cavities.

Such injection molding machines are used to manufacture "preforms", as they are normally called in the relevant art, of plastic bottles. In operation, in the closed condition of the mold, liquefied plastic, for instance PET, is injected into the space left clear between each core and the cavity into which the core reaches. After the mold cavities have thus been filled with plastic, the plastic in the cavity is held under pressure (afterpressure) for a short time to ensure a good product. Then, after a cooling period, the mold is opened. In the opened condition of the mold, a receiving device for preforms, usually designated as robot, is brought between the mold parts to take over the newly formed, still hot preforms and to transfer them to a cooling station. Then the mold can be closed again and a new injection molding cycle can be initiated.

Since such injection molding machines are very costly, it is endeavored to make use of the injection molding machines as efficiently as possible. This can be effected by arranging for a shortest possible cycle time. In this connection, 'cycle time' is understood to mean the time elapsing, in continuous operation, between the starting time of the feed of plastic to the mold for producing a first batch of articles and the starting time of the feed of plastic for a successive batch of articles.

The length of the cycle time is determined to a considerable extent by the cooling period following injection and afterpressure and preceding the opening of the mold. In a modern injection molding machine for preforms, the cooling period can be in the order of one-third of the total cycle time.

Dutch patent application 9401007 discloses an injection molding apparatus in which the cores are fitted on a plate which can be moved back and forth transversely to the direction of opening and closing of the mold. The number of cores is twice as large as the number of cavities, and the cores are arranged such that in a first position of the core plate a first set of cores cooperates with the cavities, while in a second position a second set of cores cooperates with the cavities. On opposite sides of the mold part provided with the cavities, cooling stations are arranged, which are each combined with a robot for removing the cooled preforms.

With this known apparatus, the cycle time can be considerably shortened, because the cooling of the preforms occurs outside the cavities, and hence in fact outside the cycle time, while yet the chances of damage to the preforms are very slight because the preforms can remain on the cores for a long time. However, a drawback of the known apparatus is sometimes that this apparatus has a relatively great width, which can lead to problems of space. Another drawback is the fact that two robots are necessary, or a robot alternately present on the one and the other side of the apparatus.

The object of the invention is to obviate the drawbacks outlined and generally to provide an efficient injection molding machine for manufacturing hollow plastic articles of compact construction and having a short cycle time.

According to the invention, an injection molding machine of the above-described type is characterized in that the cooling device comprises a number of cooling cavities which are located on the first mold part between the cavities of a row and at both ends of the row of cavities, and the cores of the two sets alternate with each other in a row of cores.

In the following, the invention will be further described with reference to the accompanying drawing.

Figure 2:
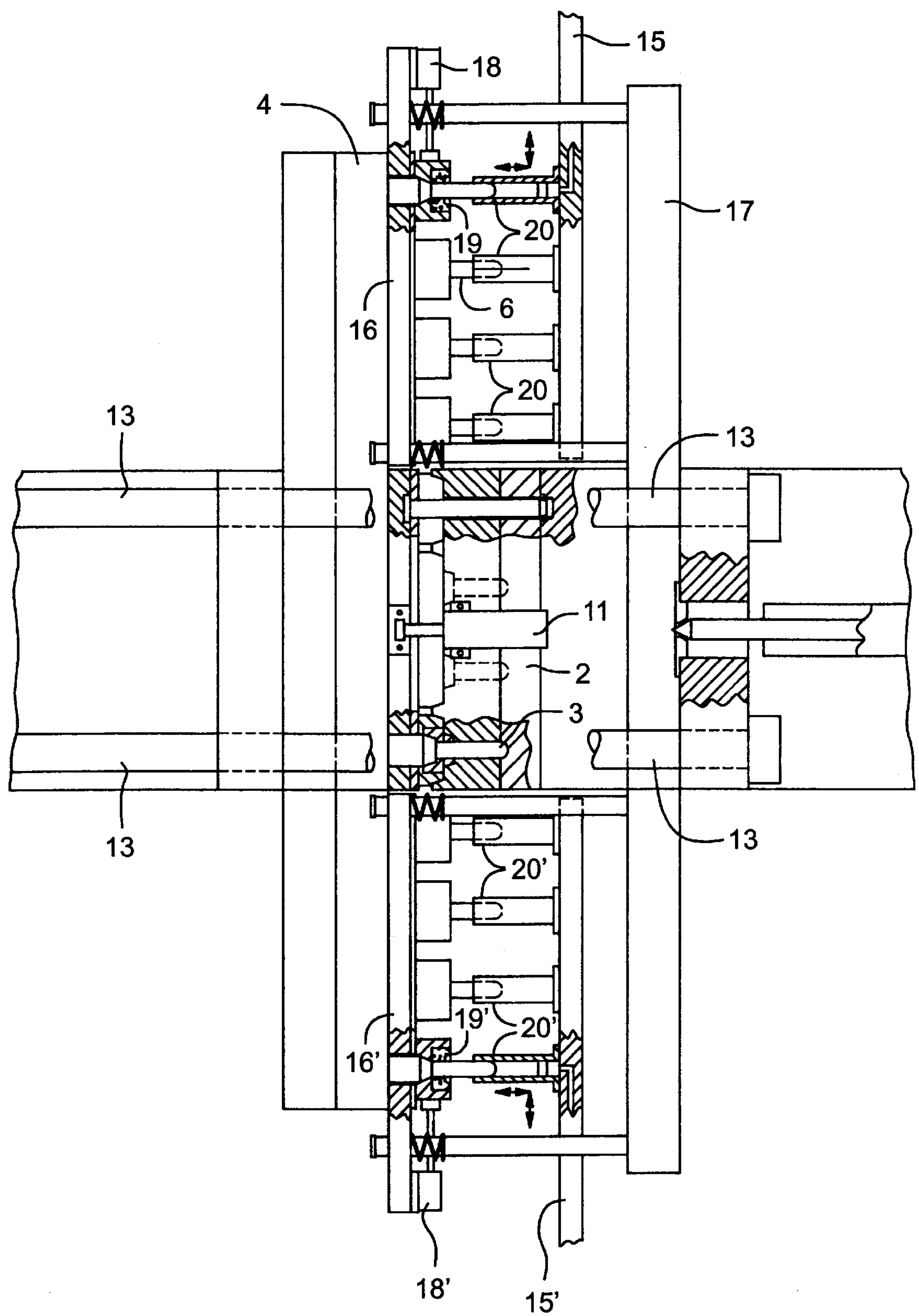
Figure 3:
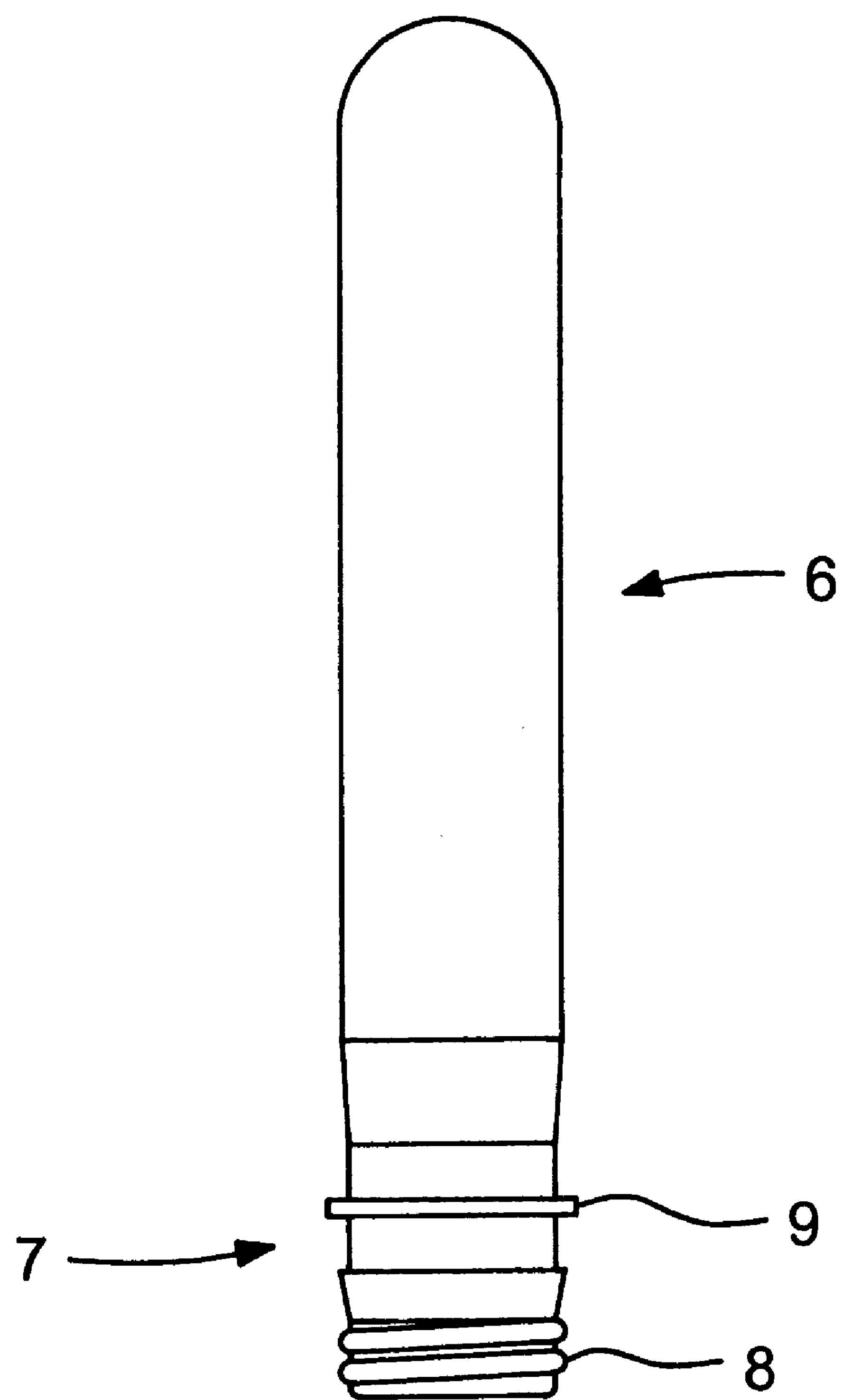
Figures 4, 5:
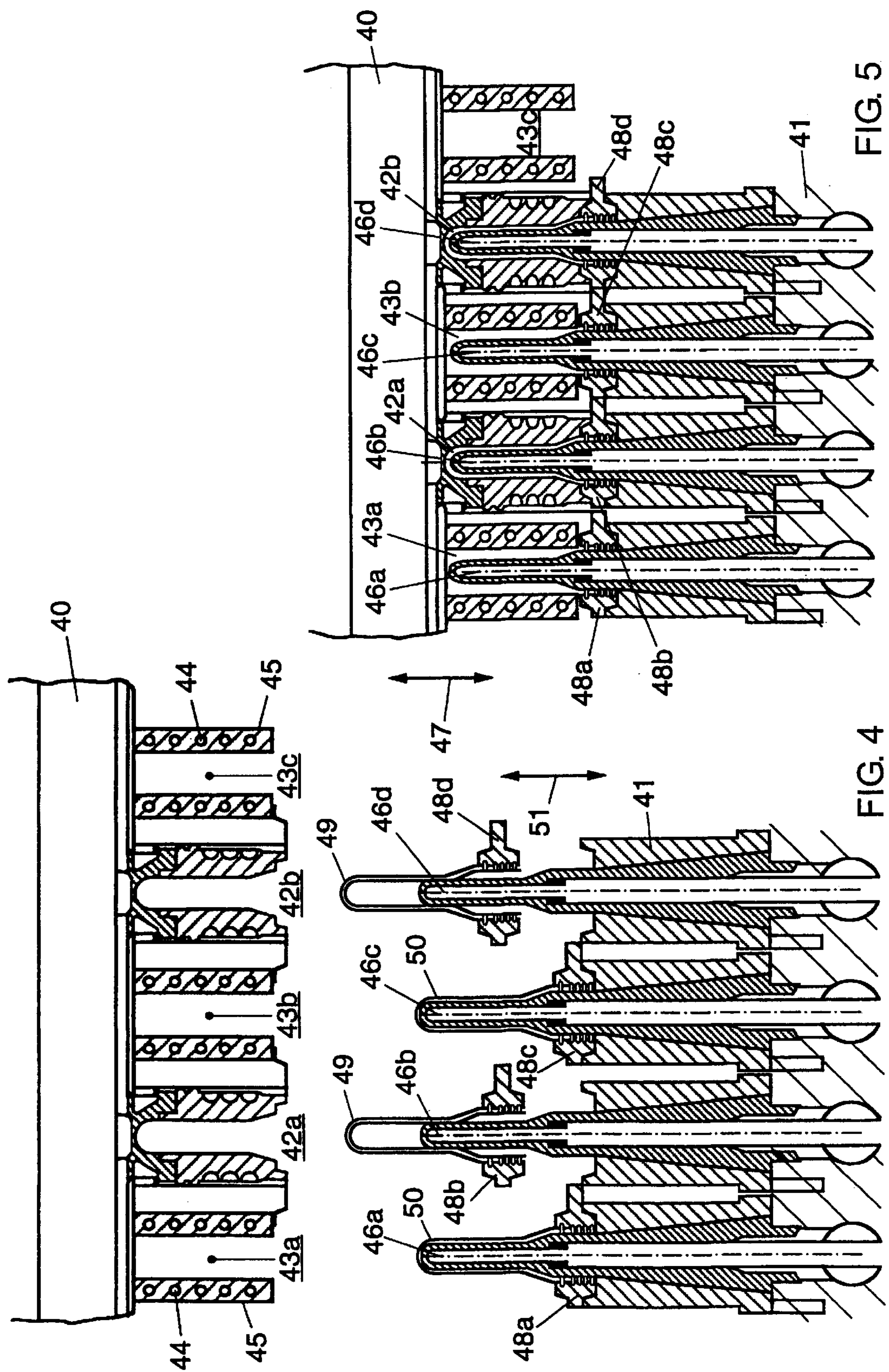
Figure 6:
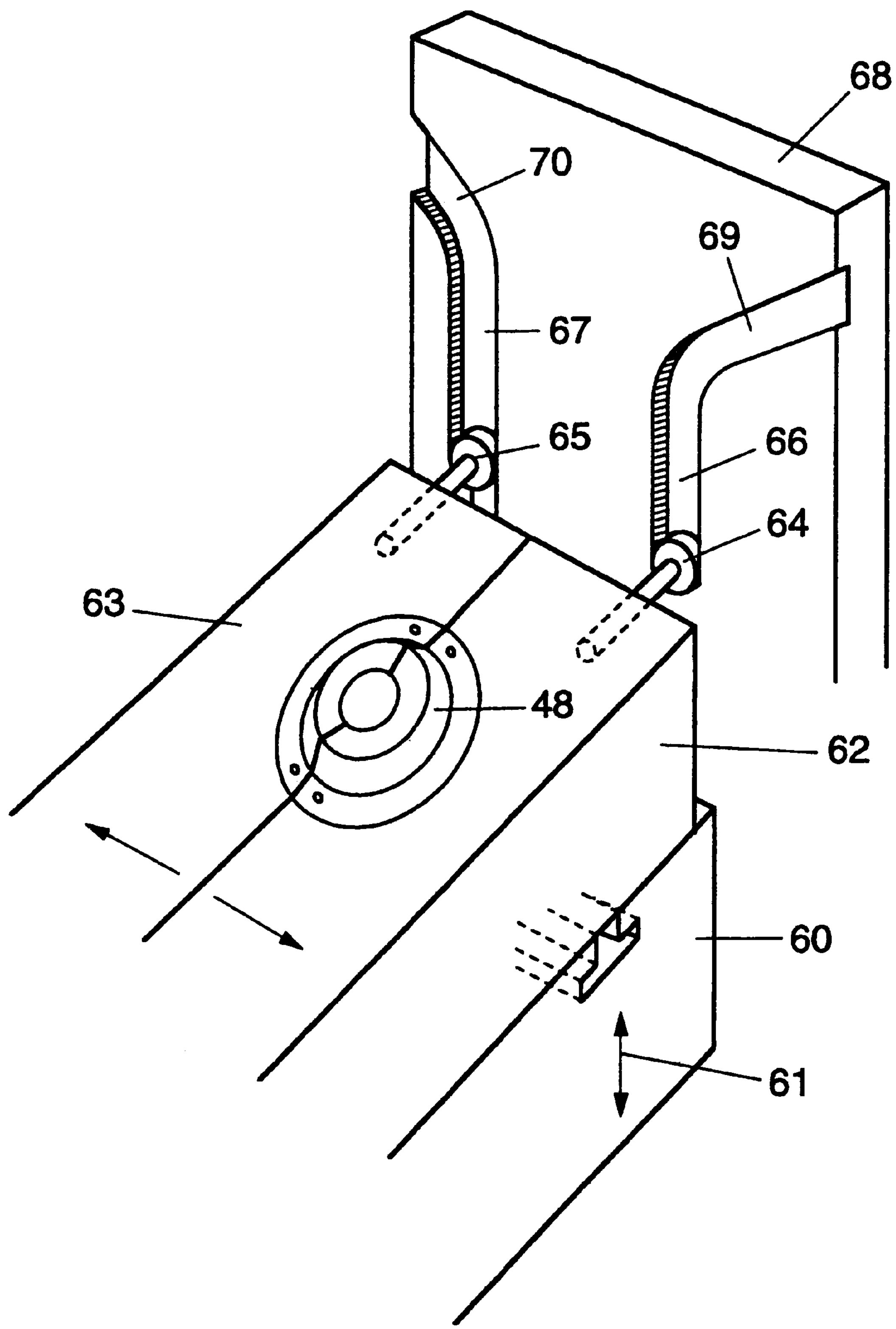

FIG. 1 schematically shows a part of an example of a known injection molding machine in opened position;

FIG. 2 shows the injection molding machine of FIG. 1 in closed position;

FIG. 3 schematically shows an example of a preform;

FIG. 4 schematically shows a part of an exemplary embodiment of an injection molding machine according to the invention in the open position;

FIG. 5 shows the injection molding machine (in part) of FIG. 4 in closed position; and FIG. 6 schematically shows a part of a detail of an example of an apparatus according to the invention.

FIG. 1 schematically shows the most important parts of a known injection molding machine 1, for instance as described in Dutch patent application 9401007. The machine comprises a first mold part 2 with one or more cavities 3. The view of FIG. 1 can be both a side view and a top plan view. Starting from a top plan view, in this example, the cavities are arranged in a matrix of one or more rows of four cavities (a different number is also possible). In the closed position of the mold, hot liquid plastic can be supplied to the cavities. In the case of bottles, this can be, for instance, PET, polypropylene, polycarbonate, or the like.

Located opposite the first mold part is a second mold part 4, which is provided with projecting cores 5. The cores are disposed opposite the cavities, and the mold parts can be moved towards each other along guide bars 13 to reach a closed position in which the cores reach into the cavities. When the cores reach into the cavities, a space around each core is left clear, into which plastic can be injected for forming an injection molded product, such as, for instance, a preform for a bottle as shown in FIG. 3 at 6. To close the injection molding cavities and for forming the neck portion 7 with screw thread 8 and flange 9, openable and closable neck rings 10 are present in the first mold part 2. The neck rings are located in strips or a plate or the like and, in this example, can be opened and closed by a hydraulic cylinder 11 and a drive-out wedge 12.

The second mold part 4 comprises two sets of cores indicated by 5 and 5', respectively.

The cores 5 and 5' can be alternately moved into the cavities 3 during successive cycles. To that end, the mold part 4, also referred to as core plate, can be reciprocated as indicated by an arrow 14.

In FIG. 1, the cores 5' carry the preforms 6 formed during the preceding cycle. The cores 5 in FIG. 1 are ready to be moved into the cavities 3 and hence are empty.

When the cores 5 are moved into the cavities, at the same time the cores 5' with the preforms 6 move into the receiving cavities or tubes of a robot 15 or a robot 15', which are disposed next to the first mold parts. Arranged in front of the robots 15, 15' are stripping devices 16, 16', which, in this example, are mounted on the same frame 17 as the first mold part 2. The stripping devices in this example have hydraulically operable (by cylinders 18, 18') stripping strips 19, 19', which can strip the preforms off the cores when the mold is opened. The tubes of the robots are indicated by 20, 20'.

The apparatus shown operates as follows. After filling of the injection molding cavities of the closed mold and after applying afterpressure, the mold is opened, so that the still hot preforms are carried along on the cores 5. During the opening of the mold, the neck rings are also opened. When the cores are clear of the cavities and the neck rings, the plate 4 is laterally displaced, so that the cores 5 take up the position 5' and the cores 5" end up opposite the cavities 3. Then the mold is closed, whereby the newly formed, still hot preforms are moved into the tubes 20 of the robot 15, as can be seen in FIG. 2. The preforms can then cool off further in the robot. When subsequently the mold is opened again, the strippers 19 are energized, so that the cores move away from the robot and the preforms remain behind in the robot. The robot arm then moves out of the machine to deliver the preforms, which have meanwhile cooled further, to a cooling conveyor or the like.

In the meantime, the plate 4 moves back again, so that the newly formed preforms end up opposite the other robot 15' and can be moved into the tubes 20' as soon as the mold is closed again. Accordingly, the preforms are alternately received by the one and the other robot.

Thus, each batch of preforms formed during an injection molding cycle can cool in the robot during the next cycle. In fact, for a considerable part, the cooling period is moved outside the cycle time, so that the cycle time can be shortened considerably.

The above-described known apparatus has a considerable width (or height) in that the cooling stations are located next to the injection molding station on opposite sides, and in that the mold part provided with cores should be twice as long as the corresponding mold part in a conventional apparatus. As a result, the known machine occupies much space, and the reciprocating mold part, also referred to as shuttle, must make a large stroke. This last leads to a delay in the cycle time and/or to an increasing risk of damage to the still fragile preforms which have been carried along.

These effects occur more prominently according as the mold parts have more juxtaposed cavities and cores, respectively. If, as often occurs, the mold parts have, for instance, a matrix of four by four cores and cavities, respectively, the length of the stroke equals the width of a old part with four cores and cavities, respectively.

FIG. 4 schematically shows a part of an injection molding apparatus according to the invention with a mold part 40 (shown in part) provided with cavities and a mold part 41 (shown in part) provided with cores. FIG. 4 shows the mold in open position, while FIG. 5 shows the mold in closed position.

The mold part 40 provided with cavities 42*a*, 42*b* differs from the conventional construction in that between each two cavities a cooling cavity 43*a*, 43*b*, 43*c* is provided. A cooling cavity is also provided at each end of a row of cavities. The cooling cavities can consist, for instance, of pipes 45 provided with cooling channels 44. A row of four cavities accordingly has five cooling cavities, each cavity flanked by two cooling cavities.

Disposed opposite the cavities and the cooling cavities is the mold part 41 provided with cores 46*a* through 46*d*. In a closed position of the mold (FIG. 5), preforms are formed around the cores 46*b* and 46*d* which reach into the cavities 42*a* and 42*b*. The other two cores 46*a* and 46*c* reach into the cooling cavities 43*a* and 43*b*. In FIG. 5 the cores reaching into the cooling cavities do not carry preforms, but during a running production, after the initial cycle, the cores reaching into the cooling cavities also carry preforms, as will appear from the following.

When the preforms have been formed in the cavities, the mold is opened, as is indicated in FIG. 5 by an arrow 47. Then the cores 46*b* and 46*d* each carry a preform. The preforms are retained by neck rings 48, which are mounted on the mold part 41. In the drawing, four neck rings 48*a* through 48*d* are to be seen. Each of the cavities, cores and neck rings can form part of a row or column of a matrix of cavities, cores and neck rings, extending transversely to the plane of the paper.

After opening of the mold, the mold part 41 is moved laterally (to the right in the drawing) over a distance equal to, respectively, the center-to-center distance of the cores, and the center-to-center distance between a cooling cavity and an adjacent cavity. The core 46*d* with the associated preform is then located opposite cooling cavity 43*c*. Similarly, the core 46*b* with a preform is located in front of the cooling cavity 43*b*, while the cores 46*a* and 46*c* without a preform are located in front of the cavities 42*a* and 42*b*.

Then the mold is closed. In the cavities 42*a* and 42*b*, preforms are formed around the cores 46*a* and 46*c*. The previously formed preforms on the cores 46*b* and 46*d* reach into the cooling cavities 43*b* and 43*c* and are cooled further. After the new preforms have been formed, the mold is opened again. All cores now carry preforms 49, 50. The mold part 41 is then moved to the left, to the position shown in FIG. 4. The newly formed preforms 50 are then located opposite the cooling cavities, while the previously formed preforms 49 are located opposite the cavities again. The previously formed preforms 49 should now be removed to create room for new preforms to be injection molded. The previously formed preforms 49 have been cooled in the cooling cavities during the production of the preforms 50 formed last, and therefore can be removed without objection. To that end, the neck rings 48*b* and 48*d* are moved forwards, as can be seen in FIG. 4. As a result, the preforms 49 slide off the cores 46*b* and 46*d*. When the preforms have been moved off the cores sufficiently far to be taken over by a robot or to fall onto a cooling conveyor or the like, the neck rings are opened and the preforms 49 are released.

It is noted that the operating means for the neck rings are so designed as to operate exclusively the neck rings 48*b* and 48*d*, that is, the neck rings of the cores disposed in front of the cavities at the beginning of an injection molding cycle. The neck rings 48*a* and 48*c* remain closed and do not move.

This makes it possible to place the cores very close to each other. In the exemplary embodiment shown, the cores are arranged so close to each other that the neck rings cannot be opened as long as the neck rings are disposed next to each other. Only when half of the number of neck rings, viz. the neck rings located opposite the cavities, have been moved forward, as indicated with an arrow 51, can the neck rings be opened to release the preforms. The manner in which the neck rings can be operated will be further explained hereinafter.

After the preforms 49 have been removed, the mold is closed again, so that a similar situation arises to that shown in FIG. 5. A difference, however, is that now also the cores 46*a* and 46*c* reaching into the cooling cavities 43*a* and 43*b* carry previously formed preforms (the preforms 50 of FIG. 4). The above-described cycle then proceeds to repeat itself as long as the production lasts. Accordingly, each time after the mold is opened, the shuttle moves alternately one step to the left and one step to the right (or upwards and downwards, respectively).

FIG. 6 schematically shows in part a strip-shaped ejection device 60 which can be moved forwards, as indicated by an arrow 61, by means not shown, which comprise, for instance, a cam member and are so designed as to operate exclusively the neck rings located opposite a cavity. The ejection device carries two neck ring strip guides 62, 63 which, in the abutting position shown, together form a set of neck rings 48. The neck ring strip guides are provided at the ends (of which only one is shown) with cams 64, 65 reaching into cam slots 66, 67 in a cam slot plate 68. The cam slots run parallel in part, but also have diverging end sections 69, 70. Accordingly, if in FIG. 6 the ejection device 60 moves up, the neck ring strip guides are first carried along in the closed position and then moved apart at the cam slot sections 69, 70, so that the neck rings open and the preforms are released.

The mold configuration described in the foregoing is such that the cooling stations are in fact situated in-between the mold cavities. This enables a highly compact construction, requiring the shuttle to make only a slight stroke. This last is further promoted by the neck ring operating method described, whereby the neck rings, viewed in the direction of the stroke, are alternately operated and non-operated, and whereby the neck rings to be opened are first moved forwards to obtain sufficient room for opening the neck rings.

As a consequence, the total dimensions of the mold parts need to be hardly any greater than those of conventional mold parts, despite the fact that one mold part includes additional cores and the other mold part includes cooling cavities. Furthermore, a single robot will suffice.

It is noted that in the foregoing, merely the operative principle of an apparatus according to the invention has been described on the basis of a diagrammatically shown example. Various modifications will therefore readily occur to those skilled in the art.

What is claimed is:

1. An injection molding apparatus for manufacturing hollow plastic articles, comprising a mold comprising a first part provided with at least one row of a number of cavities located next to each other and a second part provided with at least one row of a number of cores located next to each other while the number of cores is twice the number of cavities, and the cores comprise two sets of cores, each set arranged in a manner corresponding to the position of the cavities, and means are provided for moving the second mold part back and forth in a direction transverse to the direction of opening and closing of the mold, between two different positions, in each of which one of the sets of cores can cooperate with the cavities, while the other set of cores cooperates with a cooling device, neck rings for forming the neck portions of the containers, the cooling device comprises a number of cooling cavities located on the first mold part between the cavities of a row and at both ends of the row of cavities, and the cores of the two sets alternate with each other in a row of cores, each of the cores being provided with a neck ring and means being provided for operating exclusively the neck rings of cores located opposite the cavities in the opened position of the mold.

2. The injection molding apparatus according to claim 1 wherein the operating means for the neck rings are designed, for the purpose of ejecting preforms, first to move the neck rings over a predetermined distance in the direction of the cavities and then to open the neck rings for releasing the preforms.

3. The injection molding apparatus according to claim 2, wherein each neck ring comprises two parts which can be moved apart, mounted on an ejection device displaceable transversely to the direction of movement, the halves of the neck ring being provided with cam members which cooperate with cam slots causing the neck ring halves to move apart when the neck rings have been moved in the direction of the cavities over a predetermined distance.

4. The injection molding apparatus according to claim 3, wherein the sets of cores comprise a number of columns of cores, extending transversely to the rows, while the neck rings of the cores belonging to a column form part of neck ring strip guides extending along the columns, each comprising two parts which can be moved apart and are each mounted on an ejection guide.

5. The injection molding apparatus according to claim 1, wherein the distance between adjacent cores belonging to different sets of cores is insufficiently large to open the neck rings in the rest positions.

* * * * *